United States Patent [19]

Wölfelschneider

[11] Patent Number: 5,089,943
[45] Date of Patent: Feb. 18, 1992

[54] ILLUMINATING DEVICE, HAVING TWO IDENTICAL LAMPS CONNECTED IN PARALLEL

[75] Inventor: Lothar Wölfelschneider, Hattersheim, Fed. Rep. of Germany

[73] Assignee: VDO Adolf Schindling AG, Frankfurt am Main, Fed. Rep. of Germany

[21] Appl. No.: 626,102

[22] Filed: Dec. 12, 1990

[51] Int. Cl.⁵ ............................. F21S 5/00; G02F 1/13
[52] U.S. Cl. .................................... 362/216; 362/252; 362/23; 362/260; 359/48
[58] Field of Search .................... 362/20, 23, 29, 216, 362/252, 260, 263, 265; 350/345

[56] References Cited

U.S. PATENT DOCUMENTS

| 2,728,845 | 12/1955 | Potter | 362/216 |
| 4,748,546 | 5/1988 | Ukrainsky | 362/260 |
| 4,945,350 | 7/1990 | Kawamura | 350/345 |
| 4,950,053 | 8/1990 | Haim et al. | 350/345 |

FOREIGN PATENT DOCUMENTS

| 0274269 | 7/1988 | European Pat. Off. . |
| 8905037 | 6/1989 | PCT Int'l Appl. . |
| 2207496 | 2/1989 | United Kingdom . |

OTHER PUBLICATIONS

Information Display, Band 5, Nr. 11, Nov. 1989, pp. 8–13, New York, U.S.; W. B. Mercer, et al: "Fluorescent Backlights for LCDs".

Primary Examiner—Ira S. Lazarus
Assistant Examiner—D. M. Cox
Attorney, Agent, or Firm—Martin A. Farber

[57] ABSTRACT

An illuminating device has two lamps developed as discharge tubes which have a serpentine course and are nested in each other by, in each case, a narrow U-shaped region and a wide U-shaped region. In this way both lamps can be of identical development and permit uniform illumination of a rectangular liquid crystal cell even upon failure of one lamp.

2 Claims, 2 Drawing Sheets

ILLUMINATING DEVICE, HAVING TWO IDENTICAL LAMPS CONNECTED IN PARALLEL

FIELD AND BACKGROUND OF THE INVENTION

The present invention relates to an illuminating device for rectangular surface, which device, has two identical lamps connected electrically in parallel, in particular for illuminating a liquid crystal cell from the rear.

Such illuminating devices are customary for indicating instruments in automotive vehicles and are therefore known.

The two lamps, provided for reasons of redundancy should be as identical as possible because of considerations of cost. Upon the failure of one lamp the illuminated surface should still be easily illuminated as uniformly as possible so that the indicating instrument can still be read well. In order to save energy, to be able to operate with lamps which are as weak as possible and to make the illuminating device as compact as possible, they must be arranged relatively close to the surface to be illuminated. In the previously known illuminating device, this necessarily leads to the result that upon failure of a lamp the illumination of the surface is relatively non-uniform.

SUMMARY OF THE INVENTION

It is an object of the invention so to develop an illuminating device of the aforementioned kind that, even in the event of the failure of one lamp, the most uniform possible illumination of the surface to be illuminated can be obtained without the device becoming undesirable large and without need to use lamps of undesired brightness.

According to the invention, each lamp (3, 4) is developed as a gas-discharge tube of serpentine shape having at least one narrow U-shaped region (7, 10) and an adjoining wider U-shaped region (6, 11), the two lamps (3, 4) having their U-shaped regions (7, 10; 6, 11) nested within each other in such a manner that in each case the narrow U-shaped region (7, 10) of the one lamp (4 or 3) engages into the wider U-shaped region (6, 11) of the other lamp (4 or 3).

By this internested arrangement of the lamp, a very uniform illumination of the surface to be illuminated can still be obtained even upon the failure of one lamp. Due to the fact that each lamp has a narrow U-shaped region and a wider U-shaped region, the lamps can be arranged nested in each other in a plane despite their identical configuration without regions of the two lamps having to cross each other.

The terminals of the two lamps can, in the case of the illuminating device, be provided for the two lamps on opposite sides of the rear of the illuminating device if, in accordance with one advantageous feature of the invention, each lamp (3, 4) is formed with a sequence of regions comprising, one after the other, the narrow U-shaped region (12, 5), the wider U-shaped region (11, 6) and, adjoining same, once again a narrower U-shaped region (10, 7) which has a course which is shorter than the first narrow U-shaped region (12, 5). By such a course of the tubes a rectangular surface can be illuminated particularly uniformly.

BRIEF DESCRIPTION OF THE DRAWINGS

With the above and other objects and advantages in view the present invention will become more clearly understood in connection with the detailed description of a preferred embodiment, when considered with the accompanying drawing, of which.

DETAILED DESCRIPTION OF THE PREFERRED EMBODIMENT

Figure 1:
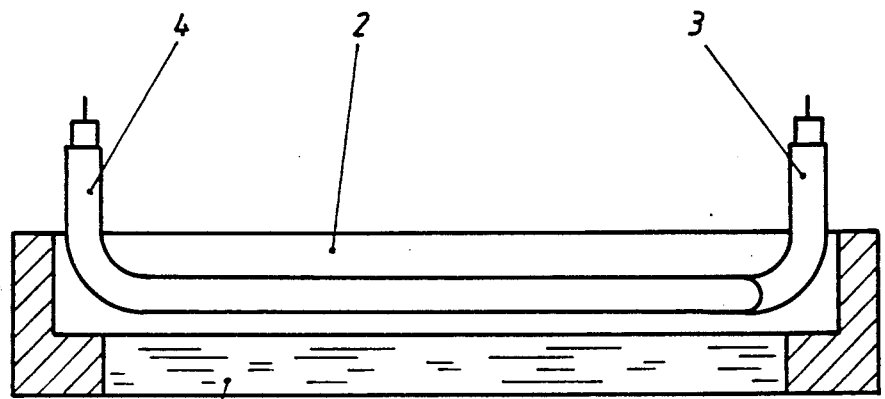
FIG. 1 is a section through an illuminating device of the invention.

FIG. 1 shows a liquid crystal cell 1 behind which a lightbox 2, shown open on its rear, is arranged. Two lamps 3, 4 developed as gas-discharge tubes are contained within and are positioned relative to each other by the lightbox 2.

Figure 2:
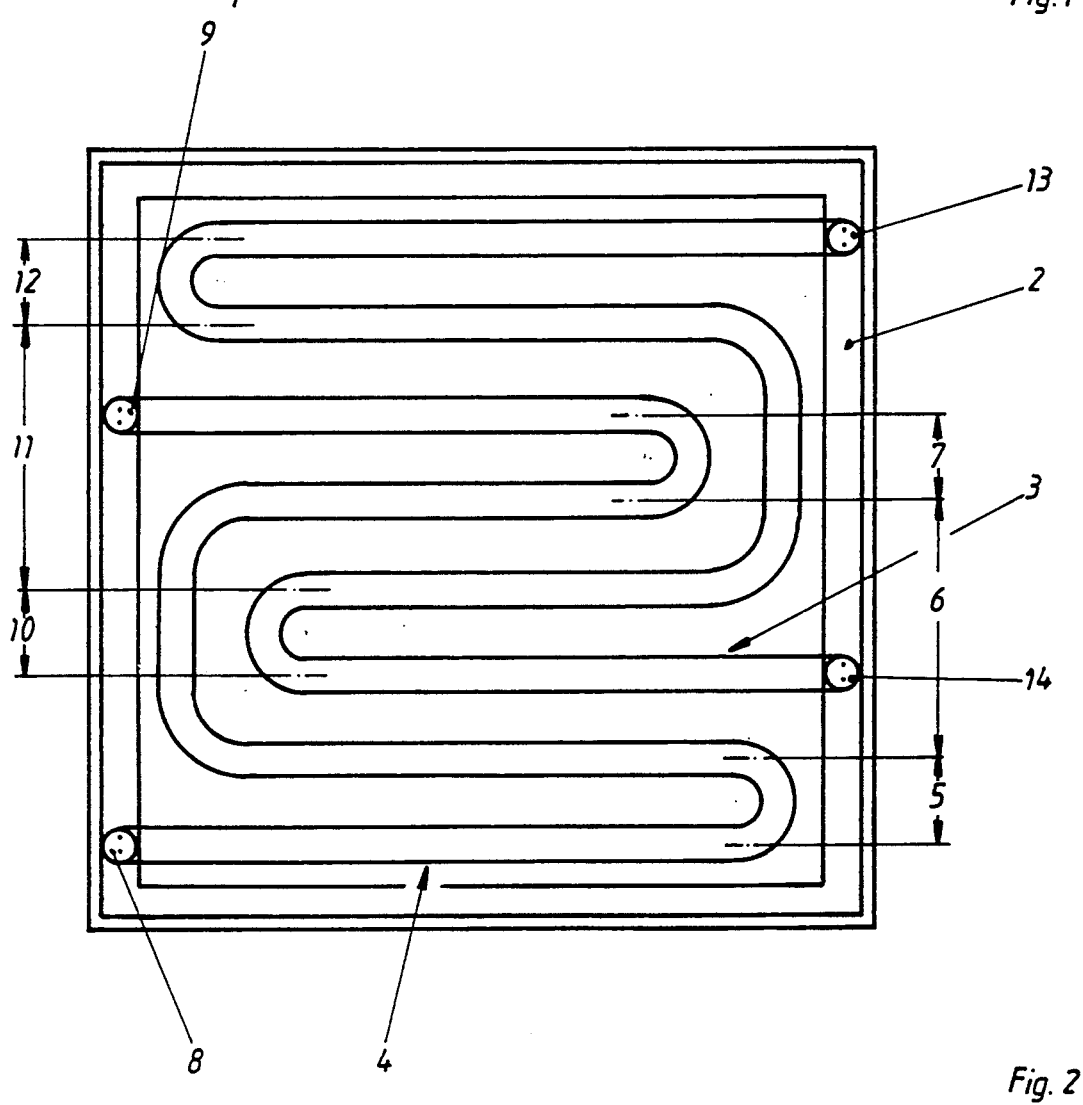
FIG. 2 is a view of the rear side of the illuminating device of FIG. 1.

The gas-discharge tubes of the lamps 3, 4 extend in serpentine shape, as shown in FIG. 2. It can be noted that the lamp 4 has first of all a narrow U-shaped region 5, adjoining this a wider U-shaped region 6, and adjoining same again a narrower U-shaped region 7. This makes it possible to arrange the ends of the lamp 4 on a common side of the lightbox 2 so that the lamp 4 has terminals 8, 9 there.

The lamp 3 is of entirely identical shape to the lamp 4. A narrow U-shaped region 10 of the lamp 3 engages into the wider U-shaped region 6 of the other lamp 4, and a wider U-shaped region 11 of the lamp 3 is arranged over the narrow U-shaped region 7 of the lamp 4. By means of an adjoining narrow U-shaped region 12, the lamp 3 is able to have both its terminals 13, 14 disposed on the same side of the lightbox 2.

In order to achieve the result that the two gas-discharge tubes are always at the same distance from each other, the narrow U-shaped region 10 in the case of the lamp 3 is less deep than its first narrow U-shaped region 12. In corresponding fashion, the narrow U-shaped region 7 of the lamp 4 is less deep than its first U-shaped region 5.

It is clear that the pattern of the gas-discharge tubes consisting of a narrow U-shaped region and a wider U-shaped region can repeated as many times as desired. In this way it is possible to illuminate a relatively large display surface.

One particular advantage of the illuminating device is that its structural depth can be kept very small.

Figure 3:
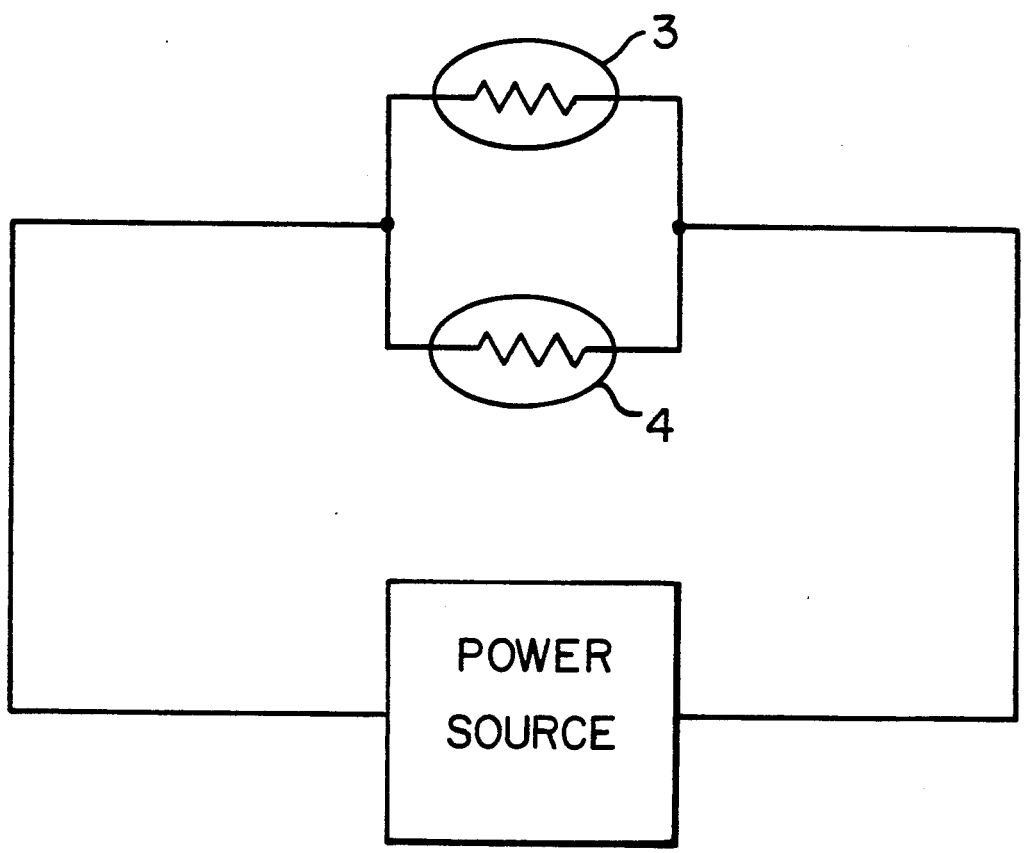
FIG. 3 is an electrical schematic of the device.

The two lamps 3 and 4 are connected electrically in parallel to a source of electric power as shown in FIG. 3.

I claim:

1. An illuminating device for illuminating a rectangular surface, comprising
   two identical lamps connected electrically in parallel; and
   means for positioning the lamps in nested arrangement wherein
   each lamp is developed as a gas-discharge tube of serpentine shape having at least one narrow U-shaped region and an adjoining wider U-shaped region;
   each lamp has its U-shaped regions nested within the U-shaped regions of the other lamp providing for engagement of the narrow U-shaped region of one lamp into the wider U-shaped region of the other lamp; and each of said lamps has, in sequential order, a first narrow U-shaped region, a wider U-shaped region and, adjoining same, a second narrow U-shaped region which is shorter than the first narrow U-shaped region.

2. A liquid crystal cell assembly comprising:

a liquid crystal cell;

a lightbox disposed behind the cell for directing light through the cell from a back surface of the cell toward a front surface of the cell;

two lamps disposed in the box in a coplanar arrangement for generating the light, each of said lamps having a serpentine shape having U-shaped bends, wherein U-shaped bends of a first of the lamps nest between U-shaped bends of the second of the lamps;

wherein each lamp is developed as a gas-discharge tube of serpentine shape having at least one narrow U-shaped region and an adjoining wider U-shaped region;

each lamp has its U-shaped regions nested within the U-shaped regions of the other lamp providing for engagement of the narrow U-shaped region of one lamp into the wider U-shaped region of the other lamp; and each of said lamps has, in sequential order, a first narrow U-shaped region, a wider U-shaped region and, adjoining same, a second narrow U-shaped region which is shorter than the first narrow U-shaped region.

* * * * *